(12) United States Patent
Peteroy et al.

(10) Patent No.: US 9,912,689 B2
(45) Date of Patent: Mar. 6, 2018

(54) ANONYMIZED NETWORK DATA COLLECTION AND NETWORK THREAT ASSESSMENT AND MONITORING SYSTEMS AND METHODS

(71) Applicant: icebrg, inc., Seattle, WA (US)

(72) Inventors: William Peteroy, Redmond, WA (US); Josh Carlson, Carnation, WA (US)

(*) Notice: Subject to any disclaimer, the term of this patent is extended or adjusted under 35 U.S.C. 154(b) by 32 days.

(21) Appl. No.: 14/838,279

(22) Filed: Aug. 27, 2015

(65) Prior Publication Data
US 2016/0065610 A1    Mar. 3, 2016

Related U.S. Application Data

(60) Provisional application No. 62/042,726, filed on Aug. 27, 2014.

(51) Int. Cl.
*H04L 29/06*    (2006.01)

(52) U.S. Cl.
CPC ...... *H04L 63/1441* (2013.01); *H04L 63/0421* (2013.01); *H04L 63/0471* (2013.01); *H04L 69/08* (2013.01); *H04L 69/22* (2013.01); *H04L 63/1408* (2013.01)

(58) Field of Classification Search
None
See application file for complete search history.

(56) References Cited

U.S. PATENT DOCUMENTS

| 8,626,749 | B1* | 1/2014 | Trepetin | H04L 9/002 707/722 |
| 9,442,980 | B1* | 9/2016 | Trepetin | G06F 17/30477 |
| 2011/0173693 | A1* | 7/2011 | Wysopal | G06F 11/3612 726/19 |
| 2014/0201541 | A1* | 7/2014 | Paul | G06F 21/6245 713/193 |
| 2014/0325669 | A1* | 10/2014 | Strasser | H04L 63/0428 726/26 |
| 2016/0359900 | A1* | 12/2016 | Crisler | H04L 63/1441 |

* cited by examiner

*Primary Examiner* — Christopher Revak
(74) *Attorney, Agent, or Firm* — Seed IP Law Group LLP

(57) ABSTRACT

Systems and methods for data collection and processing in a network, including one or more sensors disposed in a network interface and configured to collect raw signal traffic data where each sensor is further configured to parse the raw signal traffic data into network protocols; split the network protocols into content data and metadata; derive contextual metadata from the content data; compile the metadata and the derived metadata to produce anonymized metadata; encrypt the anonymized metadata; and transmit to the encrypted anonymized metadata to a unified data server.

6 Claims, 10 Drawing Sheets

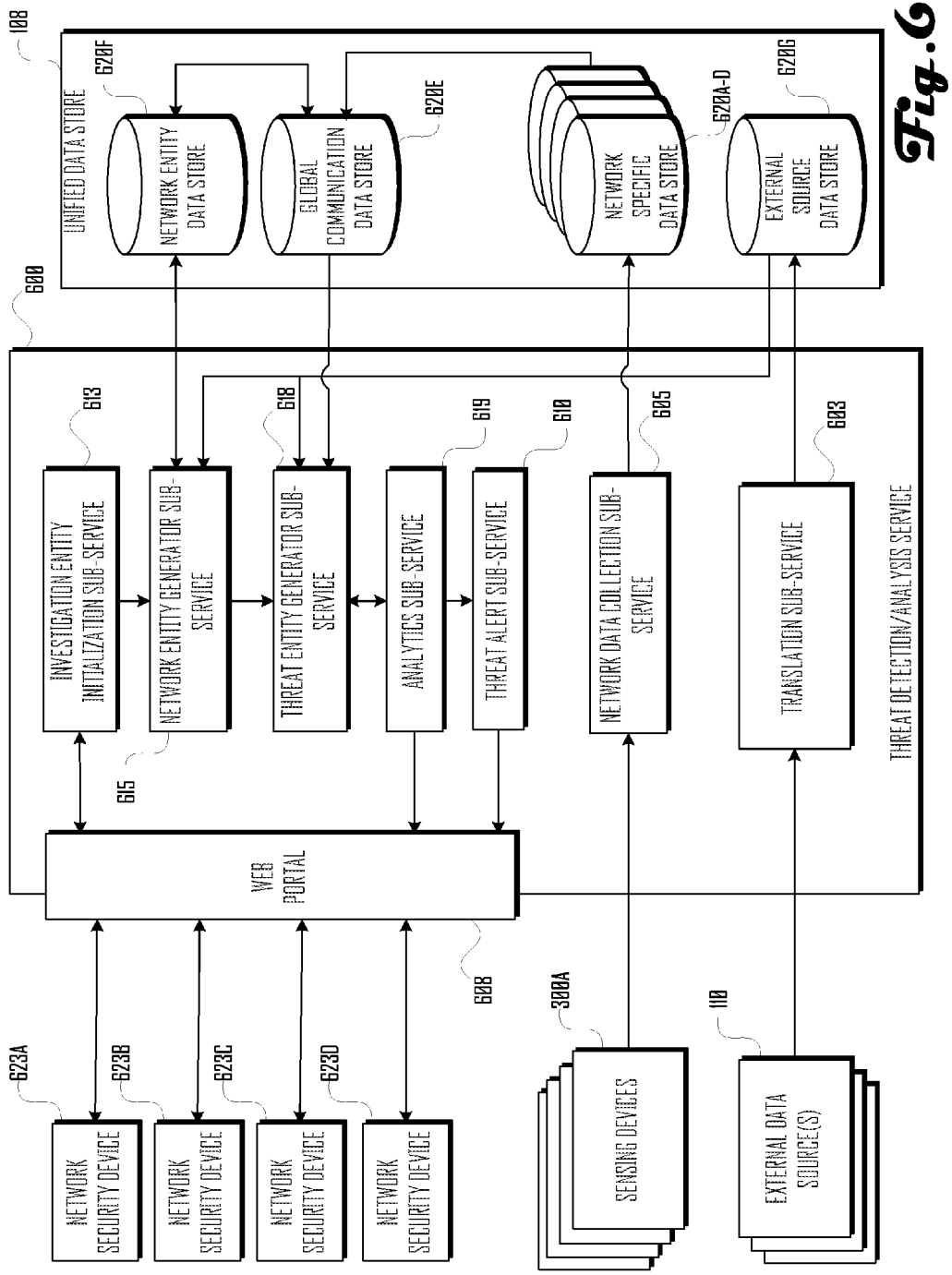

Fig. 9

ANONYMIZED NETWORK DATA COLLECTION AND NETWORK THREAT ASSESSMENT AND MONITORING SYSTEMS AND METHODS

CROSS-REFERENCE TO RELATED APPLICATIONS

This application claims priority to Provisional Patent Application No. 62/042,726 entitled System and Method for Collection and Collaborative Analysis of Flow Based Anonymized Threat Data, filed Aug. 27, 2014, the entire disclosure of which is incorporated by reference for all purposes.

FIELD

The present disclosure relates to computing and computing network security, and more particularly, to systems and methods for collecting, anonymizing, aggregating and analyzing network signal data to identify and isolate network security threats.

BACKGROUND

A computer network or data network is a telecommunications network which allows computers to exchange data. In computer networks, networked computing devices exchange data with each other along network links (data connections). The connections between nodes may be established using wired or wireless media. Computer networks differ in the transmission media used to carry their signals, the communications protocols used to organize network traffic, the network's size, topology, and organizational intent.

Networked computer devices that originate, route and/or terminate data communications on a network may be called network nodes. Nodes can include hosts, such as general purpose computers, phones, servers, networking hardware, and the like. Two devices can be said to be networked together when they are in data communication with one another, i.e. one device is able to exchange information with the other device, whether or not they have a direct connection to each other.

Nodes on a computer network may use defined communications protocols in order to exchange messages. Each message has an exact meaning intended to elicit a responsive behavior from another node on the on the network. The message may be agnostic with respect to how the responsive behavior is implemented. Communications protocols define the syntax, semantics, and synchronization of network communications and may enable possible error recovery methods. Communications protocols may be implemented by hardware, software, or a combination of both and may be conceptualized as being in a layered relationship, where more specific protocols are layered on other more general communications protocols, except for the physical layer that directly deals with the transmission media.

Computer networks support applications such as access to the World Wide Web, shared use of application and storage servers, printers, and fax machines, and use of email and instant messaging applications.

A local area network (LAN) is a computer network that interconnects computers within a limited area such as a residence, school, laboratory, or office building. A local area network is contrasted in principle to a wide area network (WAN), which covers a larger geographic distance. A wide area network may involve connecting two or more local area networks via a dedicated bidirectional telecommunications link.

An organization may set up internal Web servers, internal email, instant messaging (IM), and/or other private communication systems to allow employees to exchange private business information with each other. Together these systems form a type of network referred to as an intranet. An organization based in more than one location may enable an intranet including local area networks at various geographic locations and allow cross-location data connectivity between the various locations using a wide area network, which may span across cities or countries.

Unlike Internet-based email, instant messaging, and/or Web services (i.e. the World Wide Web), which are intended to be publicly available to anyone who can connect to the Internet, intranet services are often intended to be private and accessed only by authorized users, for example because an organization may possess valuable or inherently private data. However, many organizations desire to enable their employees/users to access the Internet from within the organization's intranet. Organizations may also desire to enable employees/users to log into the organization's network from locations that are not physically part of the intranet (e.g. employees' homes, airports, coffee shops, etc.), a capability called remote access. An organization may also desire to allow certain controlled data communications between its private computer network and the private computer network of another organization (sometimes referred to as extranets or business-to-business (B2B) networks). These are some examples of situations where an organization may have to balance the advantage of permitting some degree of outside access to its internal computer network against the risk of thereby exposing it's computer network to outside security risks Private computer networks and the devices and services that reside on them are often the subject of attacks by parties that are attempting to improperly access information and resources or to introduce malicious data and/or executable code to the networks. It may be difficult for an investigator responsible for the security of a private computer network to recognize an attack from outside the private network if the investigator only has access to data relating to the attack on his/her private network. However, due to confidentiality requirements, care must be taken when collecting data from multiple private networks belonging to different organizations, which tends to constrain cross-organizational collaboration in dealing with shared security threats.

Network defenders and information security professionals in general are often overwhelmed with information pertaining to computer network events in their environments. In addition, this information is often disjoint, giving limited insight into the different known properties of the event and therefore limiting the response and investigation potential. These network professionals are often left to manually orchestrate these different sets of information through disconnected analytic processes, the results of which contain only a narrow context derived from the superset of information the analyst started with.

Some conventional network security approaches seek to aggregate and analyze data from an adversary-controlled information domain, e.g. a computer network that may be compromised by an adversary. These products include approaches which seek to collect all network communication logs generated by security appliances and networking gear and perform security analytics. Security analytics in this conventional sense means collecting and normalizing log output with traditional security measures such as firewalls and intrusion detection systems. These systems rely on data from adversary-controlled information domains which mean that they are not capable of detecting adversaries using advanced techniques to redirect or modify traffic to the log collectors. These solutions are characterized by the goal of making a binary determination of whether or not the log data over a certain period of time is malicious or not malicious.

Another family of conventional analytics is risk analytics. Risk analytics can be applied to this family of adversary controlled information and seek to derive meaning out of application data to determine a risk score or "risk confidence score" such that they can block certain high-risk activities that would threaten the confidentiality, integrity or availability of their data.

All of these analytic approaches "flatten" data into a single temporal event or decision, thereby losing the context of the data itself. For traditional approaches, only some contexts are considered, i.e. those determined to be "important" by analysts. However, automated solutions to validating these assumptions do not appear to exist.

Most network security sensors use packet capture (pcap) to capture data and data structured on a monitored network. Some systems expand upon this collection methodology and facilitate the centralized collection of this information and provide an apparatus and method for network analysis. These systems typically operate within a single network or within multiple networks for a single customer. These systems also often require extremely large data storage and data transmission bandwidth to have the capacity to perform multiple days or weeks of collection in order to support analysis. These systems also normally parse network protocols for analytical and auditing purposes and present users with full visibility to all protocol information, i.e. metadata and data contents.

BRIEF DESCRIPTION OF THE DRAWINGS

FIG. 6 illustrates a functional block diagram of a threat assessment and detection service that may be implemented on the exemplary threat assessment server of FIG. 4.

FIG. 9 illustrates an exemplary threat entity user interface view provided by the exemplary threat assessment and detection service of FIG. 6 in accordance with at least one embodiment.

DESCRIPTION

Figure 1:
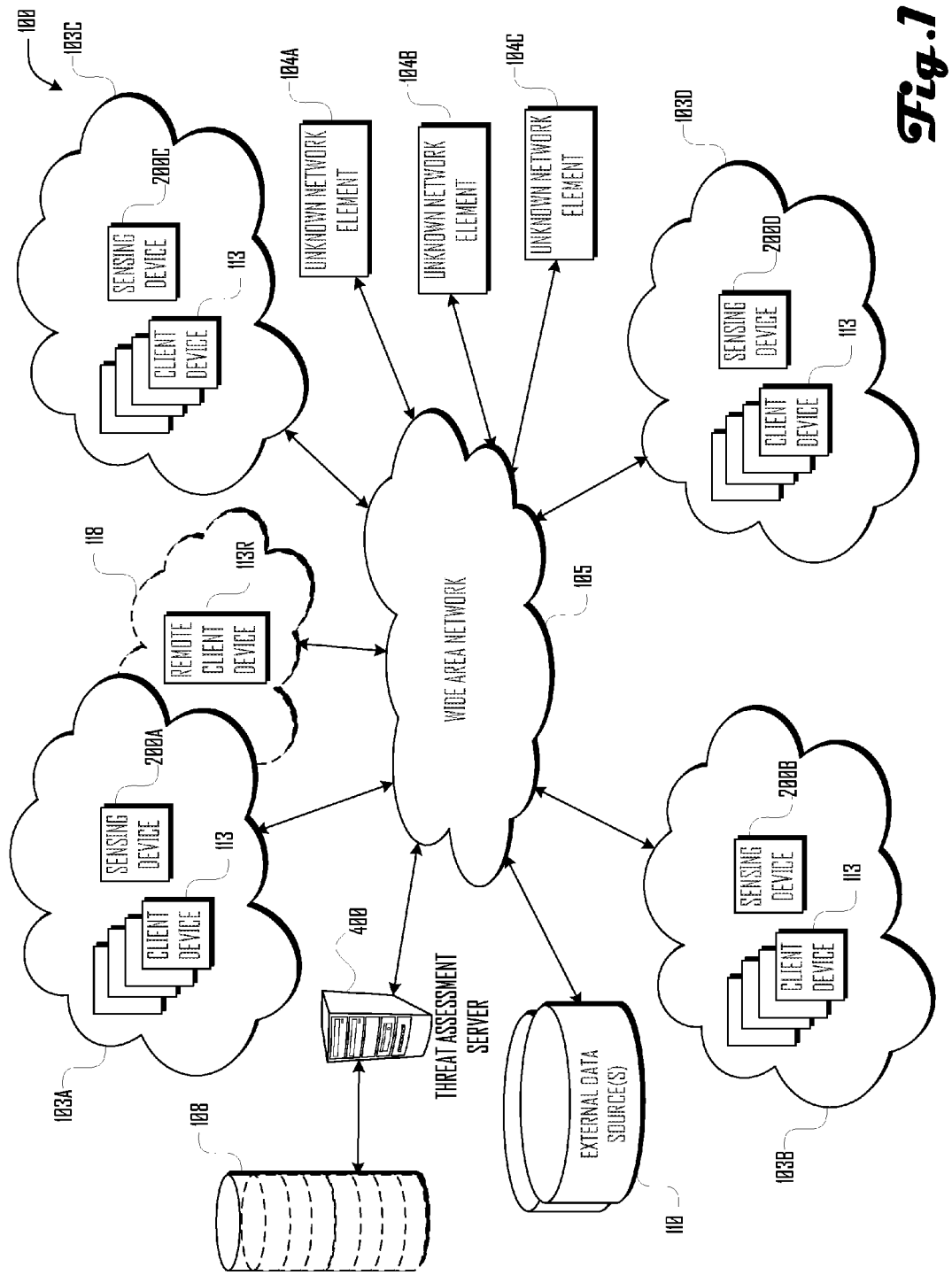
FIG. 1 illustrates an exemplary network topology of a network monitoring and threat assessment system in accordance with at least one embodiment.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file servers, computer servers, and/or memory storage devices. Each of these conventional distributed computing components is accessible by the processor via a communication network, which may include, but is not limited to, the Internet.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

Aspects of various embodiments relate to sensing devices for collecting and anonymizing signals data from a computer network (hereafter referred to as just "network"); systems and methods for aggregating and utilizing anonymized signals data collected by one or more of such sensing devices in the detection and analysis of network security threats and the generation of network and threat entity data structures; and/or systems and methods for processing, organizing, and indexing multidimensional data sets representative of anonymized network communications in order to contextualize network security events through data aggregation.

Network Monitoring and Threat Assessment

FIG. 1 illustrates an exemplary network monitoring and threat assessment system 100 in accordance with various embodiments. A threat assessment server 400 (described below with reference to FIG. 3), one or more monitored networks 103, such as monitored networks 103A-D, and one or more unknown network elements (e.g. devices and/or networks) 104, such as unknown network elements 104A-C, may be in data communication with a wide area network 105. In various embodiments, wide area network 105 may include the Internet, one or more local area networks ("LANs"), cellular data networks, and/or other data networks. Both monitored networks 103A-D and/or wide area network 105 may, at various points, be wired and/or wireless networks.

Threat assessment server 400 is a networked computing device generally capable of providing/obtaining requests over wide area network 105, and obtaining/providing responses accordingly. Threat assessment server 400 may be in data communication with a unified datastore 108 and also in data communication with one or more external data sources 110, e.g. via wide area network 105.

Unified data store 108 may be a graph database, meaning the unified data store uses graph-based structures for semantic queries with nodes, edges, and properties of the graphs being used to represent and store data. As is explained in more detail below, in such embodiments, a graph may represent a computer network with the nodes of the graph representing various network devices interconnected by edges that represent interactions between the nodes, such as data communications and the like. Nodes of a graph may also represent sub-graphs, wherein a higher level graph may represent a relatively broad network, with nodes of the higher level graph representing sub-graphs representing smaller networks within the relatively broad network, interconnected by edges representing interactions between the smaller networks. Unified data store 108 may be partitioned into multiple sub-data stores (indicated by dotted lines in FIG. 1).

Each of monitored networks 103A-D may include one or more client devices 113 in data communication with each other and/or with wide area network 105. Client devices 113 may have a form factors including general purpose computers (including "desktop," "laptop," "notebook," "tablet" computers, or the like); servers; routers; switches; mobile phones; "smart" watches, glasses, or other wearable computing devices; dedicated media players; motor vehicle head units; audio-video on demand (AVOD) systems; dedicated media consoles; or the like. A client device does not need to be physically connected to, or be in physical proximity of, a monitored network 103 to be considered part of the monitored network. For example, client device 113R may be remotely connected to monitored network 103A via a virtual private network (VPN) 118 (indicated by dashed lines) that connects across wide area network 105 and still be considered part of monitored network 103A.

In accordance with various embodiments, one or more sensing devices 200 (described below with reference to FIG. 2) may be deployed within each monitored network 103. Each sensing device 200 monitors data signals traversing its monitored network 103, parses the data signals into a meaningful representation of communications being exchanged amongst client devices 113, including communications with other nodes on the monitored network and communications with external networks (e.g. wide area network 105).

FIG. 1 is intended to depict a simplified example of a network monitoring and threat assessment system in accordance with various embodiments. In many other embodiments there may be many more monitored networks 103, including many more client devices 113, remote client devices 115, and sensing devices 200, and many more unknown entities 104 than are depicted in FIG. 1.

Sensing Devices

Figure 2:
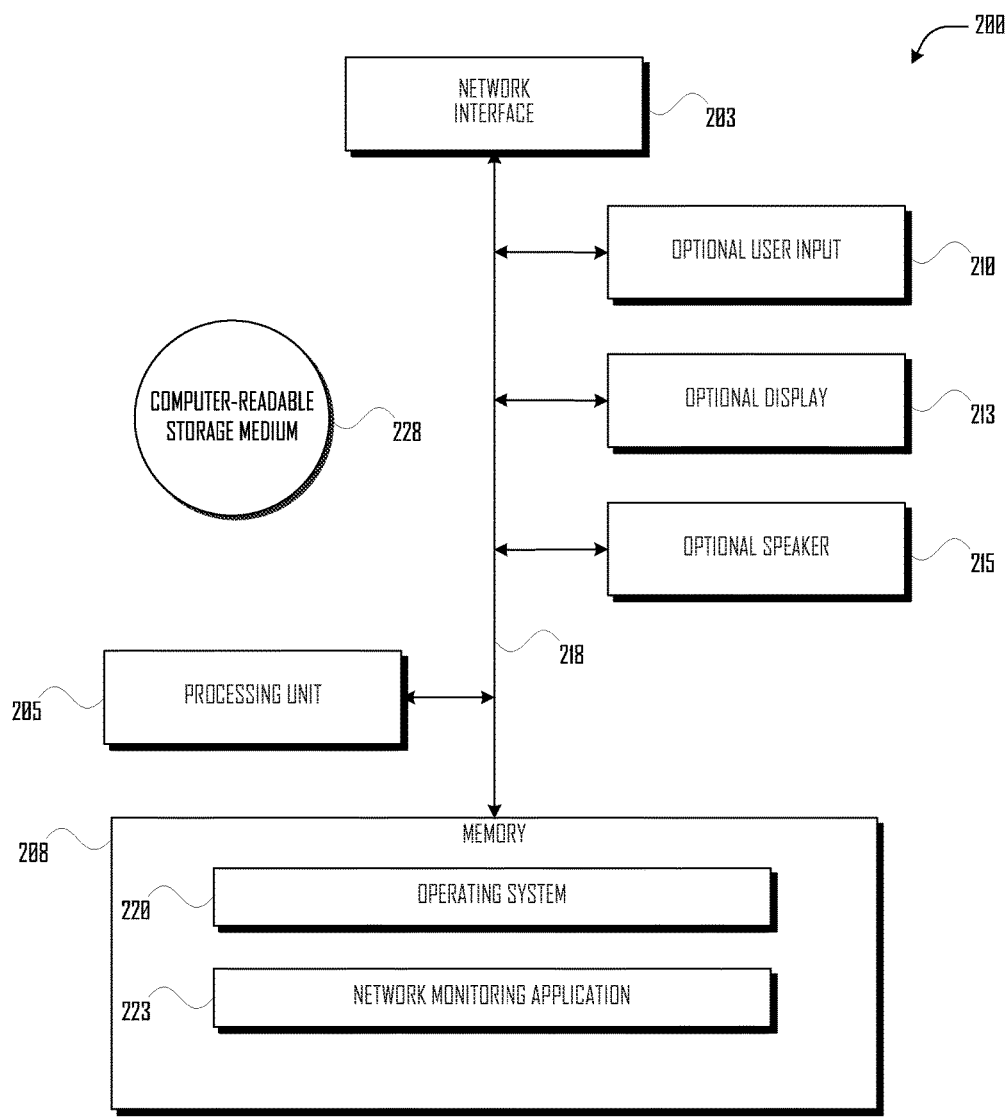
FIG. 2 illustrates several components of an exemplary network sensing device in accordance with at least one embodiment.

FIG. 2 illustrates several components of an exemplary sensing device 200, in accordance with various embodiments. In some embodiments, a sensing device 200 may include many more components than those shown in FIG. 2. However, it is not necessary that all of these generally conventional components be shown in order to disclose an illustrative embodiment. As shown in FIG. 2, exemplary sensing device 200 includes a network interface 203 for connecting to a network, such as a monitored network 103 and/or wide area network 105; a processing unit 205; and a memory 208. Exemplary sensing device 200 may also include an optional user input 210 (e.g. an alphanumeric keyboard, keypad, a touchscreen, and/or a microphone), and/or an optional display 213. All of these components may be may be interconnected via a bus 218. Memory 208 generally comprises a RAM, a ROM, and a permanent mass storage device, such as a disk drive, flash memory, or the like.

Memory 208 of exemplary sensing device 200 may store an operating system 330 as well as program code for a number of software applications, such as a network monitoring application 333, described below.

Although an exemplary sensing device 200 has been described, a sensing device 200 may be any of a great number of networked computing devices capable of communicating with network 108 and executing program code, such as the program code corresponding to network monitoring application 223. In some embodiments sensing device 200 may be a virtual appliance running on a host machine Referring generally to FIGS. 1 and 2, sensing device 200 monitors the data traffic traversing a monitored network 103, such as monitored networks 103A-D, and parses the raw data signals being exchanged amongst client devices 113 on the monitored network into a meaningful representation of discrete communications. Such communications can be subdivided into a content data portion, i.e. the actual information intended to be provided by one network node to another network node, and a network metadata portion, i.e. information used by client devices 113 and/or network 103 to facilitate the communication. For example, if a network, such as monitored networks 103A-D, is a packet switched network, then the data signals on the network may be formatted in packets containing a network metadata portion, e.g. the packet's header and/or trailer, and a content data portion, e.g. the packet's payload.

Figure 3:
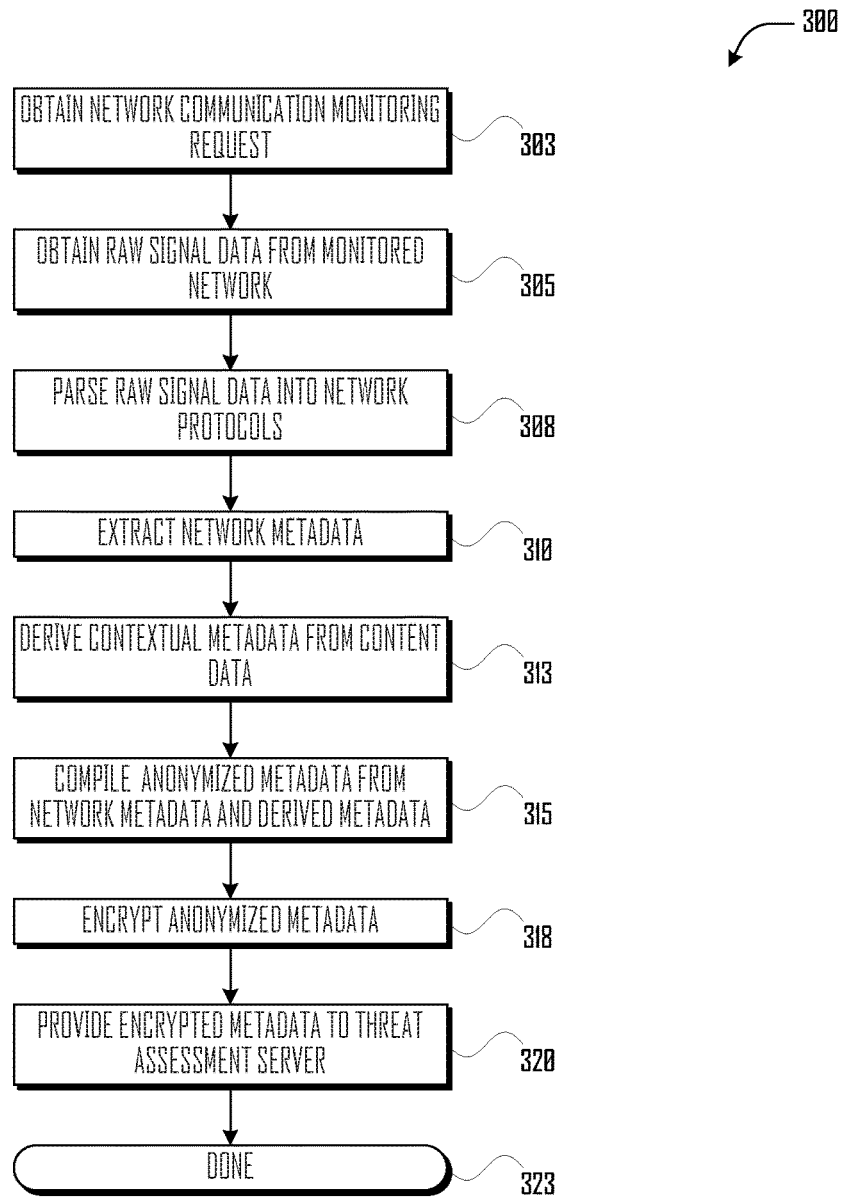
FIG. 3 illustrates a functional block diagram of an exemplary network communication monitoring sub-routine that may be implemented on the exemplary network sensing device of FIG. 2 in accordance with at least one embodiment.

FIG. 3 illustrates a network communication monitoring sub-routine 300 which may be implemented by network monitoring application 223 operating on a sensing device 200, e.g. in response to the network monitoring application detecting a communication on a monitored network 103. When network monitoring application 223 detects a communication on monitored network 103, network communication monitoring sub-routine 300 (1) extracts the network metadata portion of the communication; (2) analyzes the content data portion to derive additional contextual information about the monitored communication; and (3) compiles anonymized metadata regarding the monitored communication from the extracted network metadata and derived contextual information. Sensing device 200 may then encrypt the compiled anonymized metadata and provide it to threat assessment server 400, e.g. via a secure communication link (not shown).

Network communication monitoring sub-routine 300 obtains a network communication monitoring request at execution block 303.

Network communication monitoring sub-routine 300 obtains raw signal data representing a network communication at execution block 305. The network communication may include a content data portion and a network metadata portion.

Network communication monitoring sub-routine 300 parses the raw signal data according to its constituent network protocols at execution block 308.

Network communication monitoring sub-routine 300 extracts network metadata from the parsed signal data at execution block 310.

Network communication monitoring sub-routine 300 derives contextual metadata from the content data portion of the parsed signal data at execution block 313. For example, context metadata may be derived from the characteristics of various types of communication, such as authorization traffic, HTTP flow, encryption, VPN activity, cryptographic certificates, passive fingerprints, and application traffic.

Network communication monitoring sub-routine 300 compiles the extracted network metadata and the derived contextual metadata into anonymized network communication metadata at execution block 315. In the anonymized network communication metadata, the content data is replaced by the derived contextual metadata so that confidential information from the monitored network is not shared, while important contextual information regarding the communications occurring on the monitored network may be shared and utilized for threat assessment.

Sub-routine encrypts the anonymized network communication metadata at execution block 318.

Network communication monitoring sub-routine 300 provides the encrypted anonymized network communication metadata to threat assessment server 400 at execution block 320.

Network communication monitoring sub-routine 300 completes at block 399.

Threat Assessment Server

Referring generally to FIGS. 1-3, threat assessment server 400 obtains encrypted compiled anonymized metadata from sensing devices 200A-D. Threat assessment server 400 decrypts anonymized metadata and reconstructs the communications from monitored networks 103A-D, using anonymized data in place of the actual content data. Threat assessment server 400 then provides the reconstructed communications into various partitions of unified data store 108. For example, some aspects of the reconstructed communications obtained from sensing device 200A may be incorporated into a data store partition allocated exclusively for storing and providing data and data structures relating to the security status of monitored network 103A while other aspects of the reconstructed communications from sensing device 200A may be incorporated into a data store partition allocated for storing and providing data and data structures relating to the security status of multiple monitored networks, such as monitored networks 103A-D. Such embodiments may minimize (a) the bandwidth necessary for effective network monitoring communications between sensing devices 200A-D and the threat assessment server 300 are reduced and (b) the risk of exposing sensitive information about the monitored network 103 and/or the content data being exchanged on the monitored network. This enables the analysis of network communications without direct attribution to the originating network, which facilitates the sharing of analysis across monitored networks as well as centralized storage of threat data, e.g. in unified data store 108. The reconstructed communications are used in the generation of analytic threat entities (described below in reference to FIG. 5).

Figure 4:
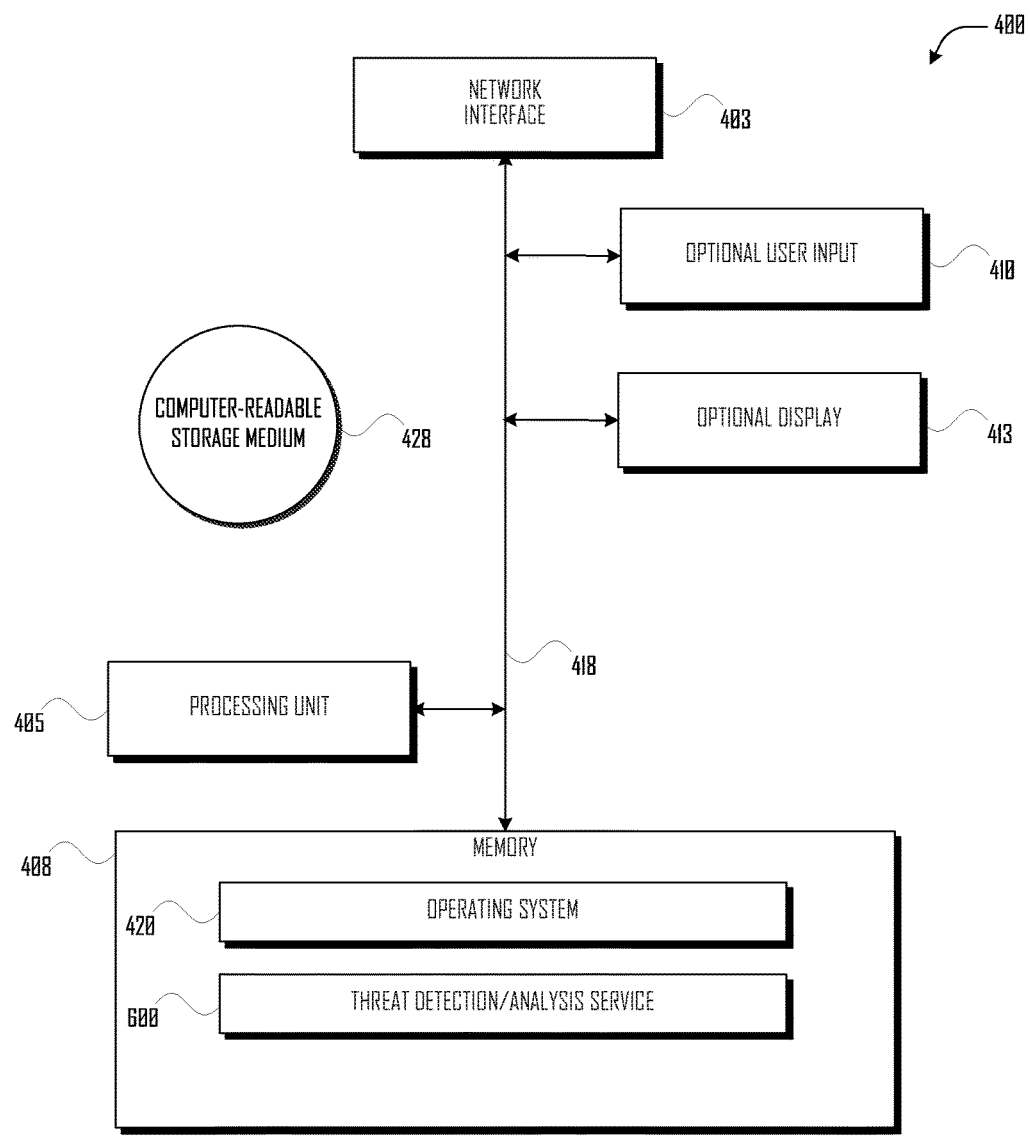
FIG. 4 illustrates several components of an exemplary remote threat assessment server in accordance with at least one embodiment.

FIG. 4 illustrates several components of an exemplary threat assessment server 400, in accordance with at least one embodiment. In some embodiments, threat assessment server 400 may include many more components than those shown in FIG. 4. However, it is not necessary that all of these generally conventional components be shown in order to disclose an illustrative embodiment. As shown in FIG. 4, threat assessment server 400 includes a network interface 403 for connecting to a network, such as wide area network 105. Threat assessment server 400 also includes a processing unit 405 and a memory 408, and may also include an optional user input 410 and an optional display 413, all interconnected along with the network interface 403 via a bus 418. Memory 408 generally comprises a random access memory ("RAM"), a read only memory ("ROM"), and a permanent mass storage device, such as a disk drive.

Memory 408 stores an operating system 230 and program code for various software services, such as threat detection and analysis service ("TDAS") 600 (described in more detail below in reference to FIG. 6). Program code for these and other such software applications or components may be loaded from a non-transient computer readable storage medium 428 into memory 408 using a drive mechanism (not shown) associated with the non-transient computer readable storage medium, such as, but not limited to, a DVD/CD-ROM drive, memory card, or the like. Software components may also be loaded into memory 408 via the network interface 403, rather than via a computer readable storage medium 428. Threat assessment server 400 may also communicate via bus 418 and/or network interface 403 with a database, such as unified data store 108, or other local or remote data stores (not shown). In some embodiments, a threat assessment server 400 may comprise one or more replicated and/or distributed physical or logical devices.

Analytic Threat Entities

In accordance with certain aspects of various embodiments, TDAS 600 continuously incorporates the anonymized communications obtained from sensing devices 200A-D, as well as data from external sources 110, into real time security status information of monitored networks 103A-D by storing, retrieving, and visualizing network security events in a threat entity data structure.

An instance of a threat entity data structure (generally referred to as a "threat entity") may be a data structure containing two or more dimensions that represent abstractions of two or more domains of knowledge about a network entity and its associated properties, including its relation with other network entities. Threat entities may permit the real-time visualization and contextualization of multidimensional network security events using create multi-scale, time series graphs by multiple anonymized investigators. A threat entity data structure may include multiple subgraphs of connected and unconnected network entities. TDAS 600 may utilize pattern recognition, predictive modeling, and/or other machine learning methods to discover non-human determinable relationships between threat entities. A multi-dimensional threat entity structure may permit TDAS 600 to identify relationships among network devices that are not discoverable without the help of machine or computerized processes.

A threat entity may be generated based on multiple data sources and will reflect the characteristics of the data source used. For example, a threat entity generated and rendered from a data store associated with a single monitored network, e.g. monitored network 103A, will result in a threat entity that reflects a context specific to that monitored network, whereas a threat entity generated and rendered from a data store associated with multiple monitored networks, e.g. monitored networks 103A-D, will result in a threat entity that reflects the context of those monitored networks.

Threat entities may be extensible, in that they may incorporate data from external data sources through a translation sub-service (see FIG. 6, below). The translation sub-service allows for the integrated consumption of external indicators, threat information, intelligence, or other data. Because threat entities may be developed from anonymized metadata, they can be shared in real-time by multiple, independent users as external data sources without disclosing private or organization-identifiable information. As a result, multiple users may view the same threat entity, where each user is provided with a view that is specific to their context, but based on multiple data sources and analytics including shared sources.

A threat entity may permit TDAS 600 to identify relationships among events on disparate networks (e.g. an event on monitored network 103A and an event on monitored network 103C).

Figure 5:
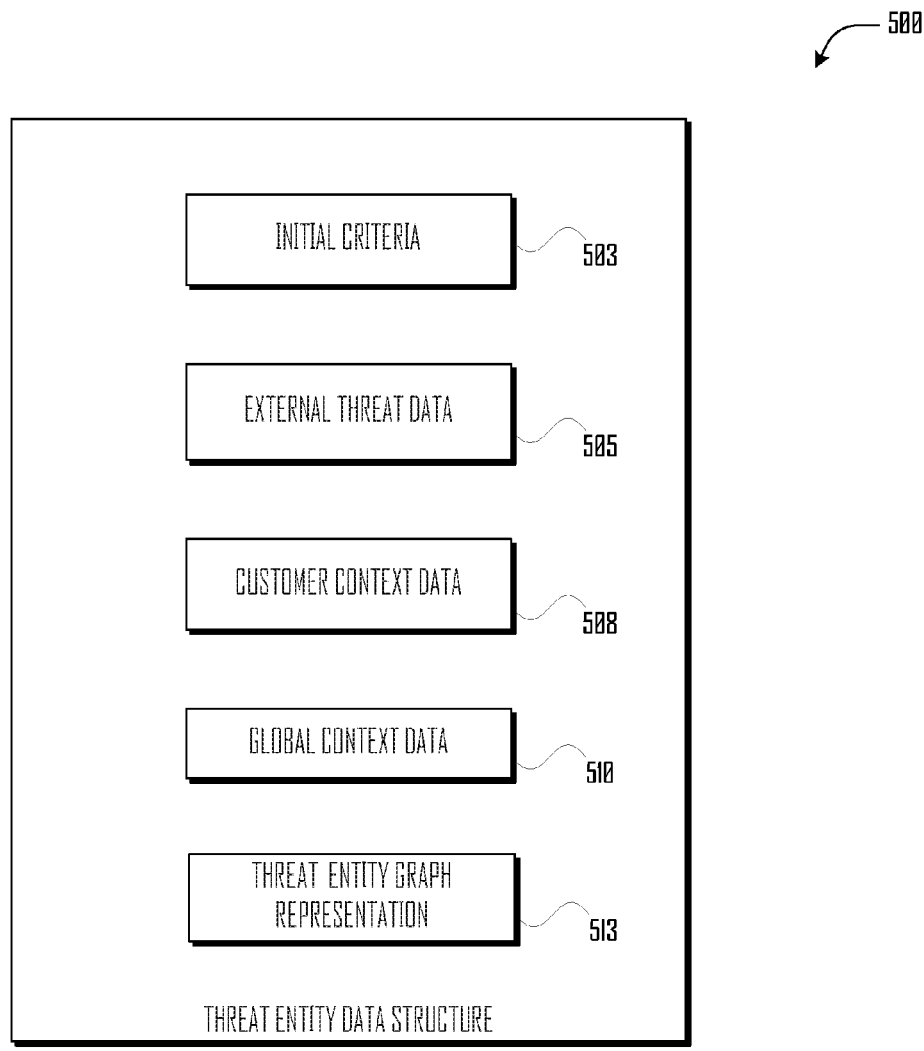
FIG. 5 illustrates a component block diagram of a threat entity data structure in accordance with at least one embodiment.

FIG. 5 illustrates the make-up of an exemplary threat entity data structure 500, in accordance with various embodiments. Threat entity data structure 500 may include initial threat data 503, e.g. data related to the initial creation of the threat entity (described below); external threat data 505, e.g. data obtained from external data source(s), such as external data source 110; network specific context data 508, e.g. anonymized data obtained from a particular monitored network, e.g. monitored network 103A; global context data 510, e.g. anonymized data obtained from a multiple monitored networks, e.g. monitored network 103A-D; and/or a threat entity graph representation 513, which may provide a representation of relationships between one or more monitored networks, such as monitored networks 103A-D, one or more unknown devices and/or networks, such as unknown network elements 104A-C, one or more wide area networks, such as wide area network 105, and/or threat entity 500.

Various embodiments of threat entity data structure 500 may be used to store, retrieve, and visualize network security events in a time-series, multi-scale graph with contextual representation around multiple feature vectors. Threat entities may also provide a structure for distributed and anonymized hypothesis generation around the characteristics, behavior, and connectedness of a multiscale graph of network entities and associated properties. Threat entities may also be utilized in a system for a centralized collaboration workspace where the time-series multiscale graph of each threat entity is contextualized with a tailored view for each investigator or analyst.

Threat entities may also allow the collection of unstructured data about a network that enables metrics, such as centrality, modularity, and the like, which may be ineffective when applied to raw traffic patterns, to be used to construct and demonstrate relationships between different attacks and attackers that would otherwise be difficult to observe.

Threat entities may utilize large collections of data, e.g. "big data," to provide a more complete context of a single event in time. The use of shared data through a threat entity structure may also permit domain specific observations of a seemingly outlier event to feed into higher level analysis of the event. Threat entities may be utilized to construct a graph for higher level analytics.

Threat Detection and Analysis Service ("TDAS")

FIG. 6 illustrates a functional block diagram of various sub-services of threat detection and analysis service ("TDAS") 600. TDAS 600 may include a network data collection sub-service 603 for obtaining the encrypted anonymized network data from sensing devices 200; a translation sub-service 605 for obtaining network security data from external data sources, e.g. external data source 110; a web portal 608 for allowing network security investigators operating network security devices 609A-D, which may be client devices 113 on respective monitored networks 103A-D, to interact with TDAS 600; a threat alert sub-service 610 for detecting potential network security threats and providing notifications to appropriate network security investigators, e.g. via web portal 608; an investigation entity generator sub-service 613 for creating investigation entities (described below); a network entity generator sub-service 615 (described below); a threat entity generator sub-service 618 (described below); and an analytics sub-service 619. As is illustrated in FIG. 6 and described below, many of these sub-services provide data to and/or obtain data from each other and/or various data store partitions 620A-G within unified data store 108.

If TDAS 600 identifies a potential threat to a monitored network, an alert is provided for display to a user, e.g. an investigator responsible for the security of the monitored network. If a responsive indication is received from the user that confirms the threat, TDAS 600 generates a network entity, which may include a graph representation of the attacking network element (e.g. a device and/or a network) and related elements, and then provides the network entity for display to the user. TDAS 600 may also generate a threat entity that represents and describes the network-specific context for the threat, e.g. the infected hosts within the monitored network and intra-network traffic related to the threat, as well as global context, such as information from other monitored networks and/or external sources. TDAS 600 may also provide the threat entity, which may include a graph representation, for display to the user. TDAS 600 may continuously obtain data from both the threatened monitored network and other monitored networks, which may provide additional context for the threat entity. When TDAS 600 obtains such relevant additional context, that information is integrated into the threat entity, which is updated and provided for display to the user. TDAS 600 may thereby provide the user with real-time information regarding the attack. Analytics sub-service 619, described below, may also be used to enrich the threat entity data by identifying additional relationships and contexts and to generate a threat entity graph representation of those relationships. When the threat entity is updated by the analytics sub-service 619, TDAS provides the updated threat entity for display to the user.

Figure 7A:
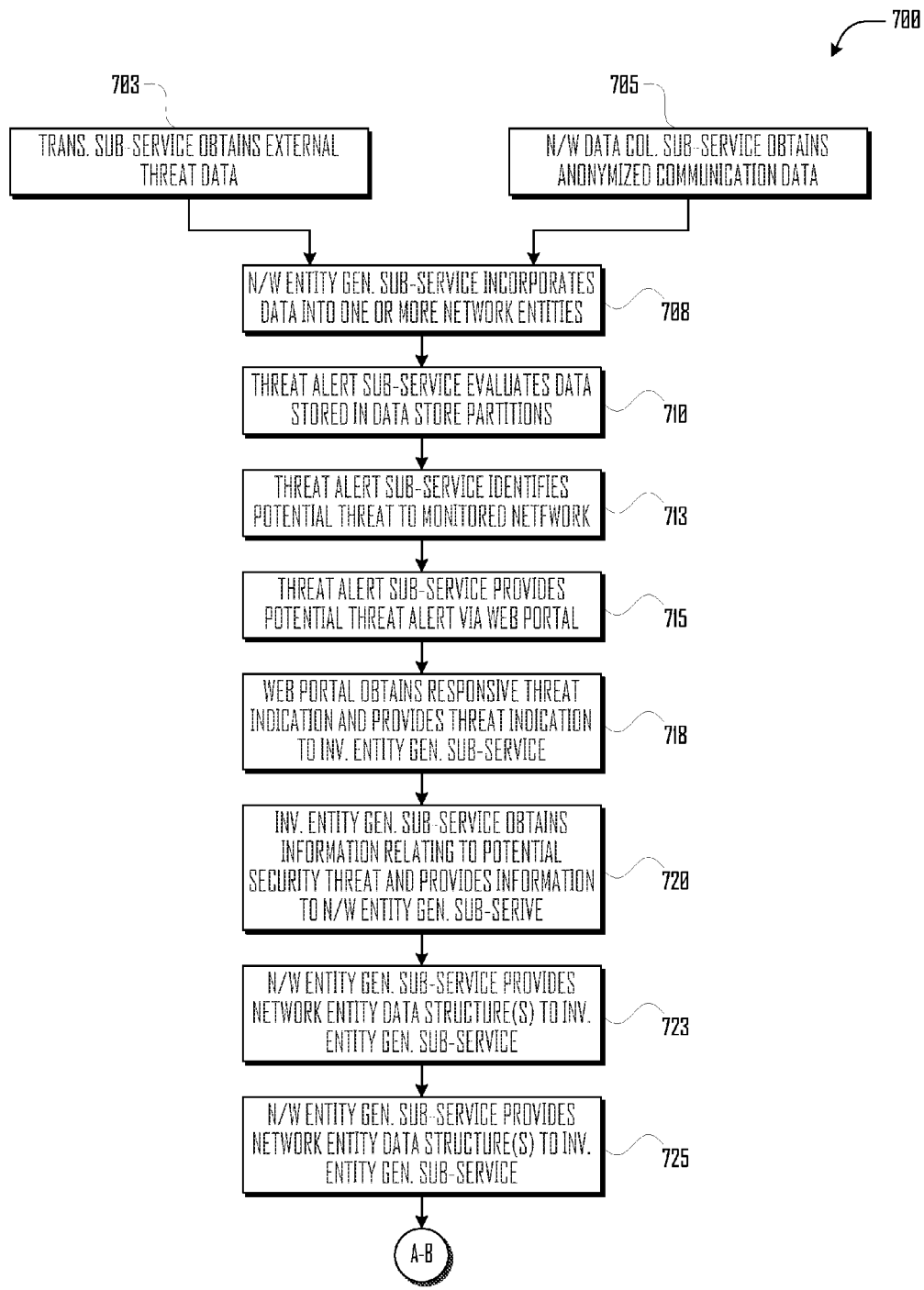
FIGS. 7a and 7b illustrates a functional block diagram of threat detection and analysis flow that may be implemented by the exemplary threat assessment and detection service of FIG. 6 in accordance with at least one embodiment.
Figure 7B:
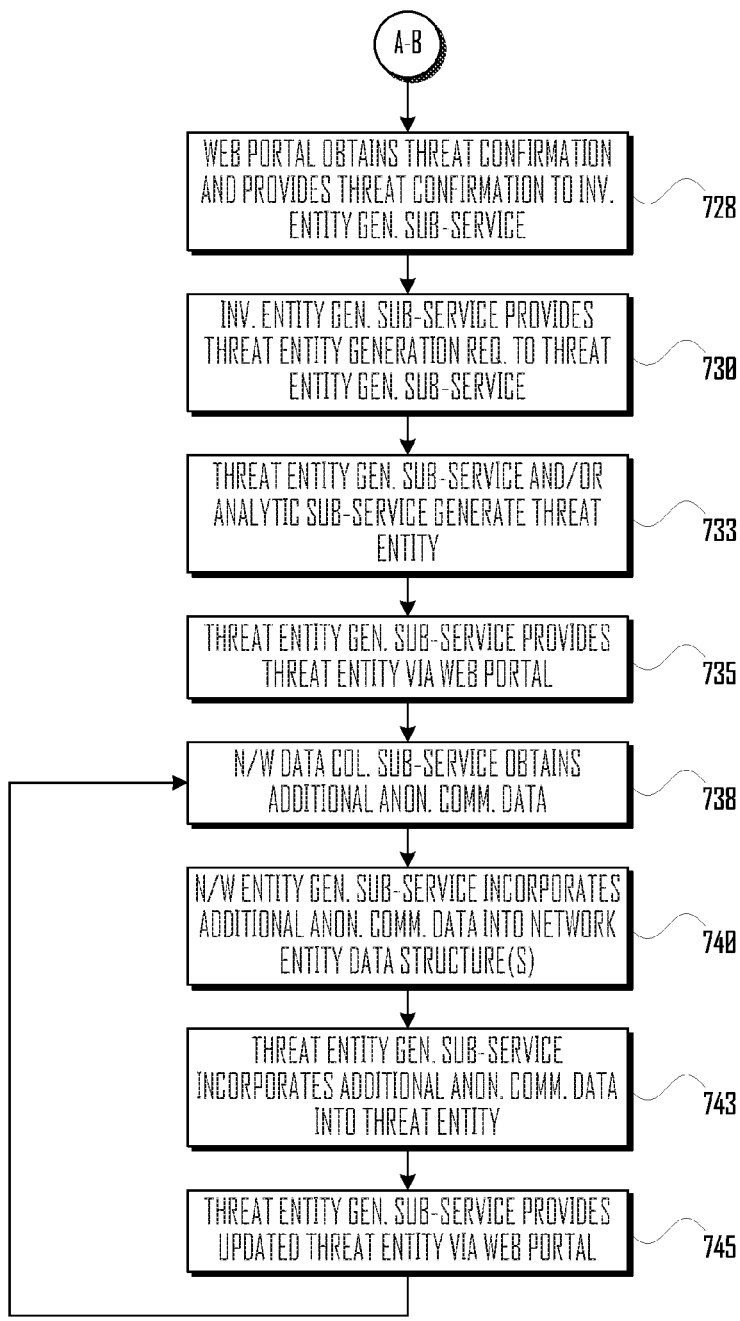

FIGS. 7a and 7b illustrate a threat detection and analysis flow 700 which may be implemented by various aforementioned sub-services of TDAS 600 operating on threat assessment server 300. TDAS 600 provides interactive threat detection and analysis services to users operating monitored networks, such as monitored networks 103A-D. Network communications from monitored networks 103A-D are continually collected by sensing devices 200, anonymized, and provided to network data collection sub-service 603. This anonymized data is used by analytic sub-service 610 to continually update the security status of monitored networks 103A-D.

At block 703, translation sub-service 603 may obtain external threat data from one or more external data sources, e.g. external data source 110. Translation sub-service 603 may incorporate the external threat data into external threat data stored in external source data store partition 620G.

At block 705, network data collection sub-service 605 may obtain anonymized communication data from one or more sensing devices, in this example sensing devices 200A-D. Network data collection sub-service 605 may reconstruct the anonymized communications data. Network data collection sub-service 605 may incorporate some aspects of the reconstructed anonymized communications data into network-specific data stored in data store partitions allocated exclusively for a monitored network, e.g. network specific data store partitions 620A-D, respectively. Network data collection sub-service 605 may incorporate other aspects of the reconstructed communications data into non-network-specific data stored in global communication data store partition 620E.

At block 708, network entity generator sub-service 615 may incorporate data stored in external source data store partition 620G, network specific data store partitions 620A-D, and/or global communication data store partition 620E into one or more existing network entity data structures (which may be similar to threat entity data structures 500) stored in network entity data store 620F.

At block 710, threat alert sub-service 619 may evaluate data stored in external source data store partition 620G, network specific data store partitions 620A-D, global communication data store partition 620E, and/or network entity data store 620F.

At block 713, threat alert sub-service identifies a potential threat to a monitored network, monitored network 103A in this example, and, at block 715, threat alert-sub-service provides a potential threat alert via web-portal 608, e.g. to a network security investigator responsible for threatened monitored network 103A.

At block 718, web portal 608 obtains a responsive threat indication, e.g. from the network security investigator responsible for threatened monitored network 103A, and provides the threat indication to investigation entity generator sub-service 613.

At block 720, investigation entity generator sub-service 613 may obtain information relating to the potential security threat to monitored network 103A, e.g. identifiers of one or more devices and/or networks that are involved in the potential threat, and provides the information to network entity generator sub-service 615.

At block 723, network entity generator sub-service may provide one or more network entity data structures corresponding to one or more devices and/or networks associated with the potential threat to monitored network 103A to investigation entity generator sub-service 613, which incorporates the network entities into an investigation entity.

At block 725, investigation entity generator sub-service 613 may provide the investigation entity to the network security investigator responsible for threatened monitored network 103A via web portal 608. The investigation entity may include an investigation entity graph representation, which may provide a representation of relationships between one or more monitored networks, such as monitored networks 103A-D, one or more known or unknown network elements, such as unknown network elements 104A-C, and/or one or more wide area networks, such as wide area network 105.

At block 728, web portal 608 may obtain a threat confirmation, e.g. from the network security investigator responsible for threatened monitored network 103A, and provide the threat confirmation to investigation entity generator sub-service 613.

At block 730, investigation entity generator sub-service 613 may provide a threat entity generation request, which may include the investigation entity, to threat entity generation sub-service 618.

At block 733, threat entity generator sub-service 618 and analytics sub-service 618 may generate one or more threat entity data structures 500 corresponding to the potential threat to monitored network 103A and which may include one or more network entity data structures.

At block 735, threat entity generator sub service 618 may provide the one or more threat entity data structures to the network security investigator responsible for threatened monitored network 103A via web portal 608. The one or more threat entities may include one or more threat entity graph and/or sub-graph representations, which may provide a representation of relationships between one or more monitored networks, such as monitored networks 103A-D, one or more known or unknown network elements, such as unknown network elements, and/or one or more wide area networks, such as wide area network 105.

At block 738, network data collection sub-service network may obtain additional anonymized communication data from one or more sensing devices, in this example sensing device 200B. Network data collection sub-service 605 may reconstruct the additional anonymized communications data. Network data collection sub-service 605 may incorporate some aspects of the additional reconstructed anonymized communications data into network-specific data stored in data store partitions allocated exclusively for a monitored network, e.g. network specific data store partition 620B. Network data collection sub-service 605 may incorporate other aspects of the additional reconstructed communications data into non-network-specific data stored in global communication data store partition 620E.

At block 740, network entity generator sub-service 615 incorporates the additional reconstructed communications data into one or more existing network entity data structures stored in network entity data store 620F.

At block 743, threat entity generator sub-service 618 and analytics sub-service 618 may incorporate such additional reconstructed communications data into one or more threat entity data structures 500 corresponding to the potential threat to monitored network 103A and which may include one or more network entity data structures.

At block 745, threat entity generator sub service 618 may provide the one or more threat entity data structures to the network security investigator responsible for threatened monitored network 103A via web portal 608. The one or more threat entities may include one or more threat entity graph and/or sub-graph representations, which may provide a representation of relationships between one or more monitored networks, such as monitored networks 103A-D, one or more known or unknown network elements, such as unknown network elements 104A-C, and/or one or more wide area networks, such as wide area network 105.

Use Case

Referring generally to FIGS. 1-7, by way of example assume a client device 113 on monitored network 103A may communicate with unknown network element 104A. Sensing device 200A may monitor the communication between client device 113 and unknown network element 104A, extract the network metadata portion of the communication, derive anonymized contextual information about the monitored communication from the content data portion, encrypt and compile the anonymized metadata, and provide the encrypted, compiled metadata to network data collection sub-service 603.

Network data collection sub-service 603 may then generate an anonymized reconstruction of the communications between the client device 113 and the unknown network element 104A. The reconstructed communications are then provided to a network specific communication data store 620A, i.e. the data store partition allocated to monitored network 103A, and/or to a global communication data store 620B. These communications, along with all other communications being received by network data collection sub-service 605 from all monitored networks and external data begin received by translation sub-service 603 are continuously incorporated into a dynamic threat analysis being performed by analytic sub-service 610.

Analytic sub-service 610 may utilize conventional network security tools, e.g. signatures, blacklists, and the like, as well as algorithms for detection of suspicious network traffic patterns and cross referencing traffic and endpoints with existing information in the unified data store, such as a suspicious network entity's reputation information and other analytics in order to initially identify potential threats to monitored networks 103A-D.

If such a threat is detected, analytic sub-service 619 my cause threat alert sub-service 610 to generate a potential threat alert notification with regard to monitored network 103A. An investigator responsible for monitoring the network security of monitored network 103A and operating network security device 623A may obtain the potential threat alert notification via web portal 608. In response, TDAS 600 may obtain a request to create an investigation entity from network security device 623A. An investigation entity may, for example, be based on the IP address of the potential threat, e.g. unknown network element 104A.

A network entity generator sub-service 615 may obtain a network entity corresponding to the IP address of unknown network element 104A from a network entity data store partition 620F of unified data store 110 and associate the obtained network entity with newly created investigation entity. Network entity generator 615 may also obtain external data, such as reputation data, known attack types, historical campaigns, attackers, and the like, associated with the network entity from an external source data store partition 620G of unified data store 110 and integrate that information into the newly created investigation entity. Analytics sub-service 619 may generate a graph-based representation of the investigation entity illustrating how the unknown network element 104A intersects with monitored network 103A, which may be provided to network security device 623A via web portal 608, e.g. a graph where graph nodes represent network nodes, such as client devices 113, and graph edges represent interactions, such as data communications, between the network nodes. In some embodiments, the association of a network entity with an investigation entity may cause a reputation component of the network entity to be reduced in the network entity data store.

If network security device 623A notifies TDAS 600 the communications between unknown network element 104A and monitored network 103A are malicious, the investigation entity passed to threat entity generator sub-service 618, converted to a threat entity, and assigned an identifier, e.g. Threat Entity 1.

Referring to FIG. 5, threat entity generator sub-service 618 generates a threat entity data structure that may be populated with initial threat criteria 503, external threat data 505 from the external source data store 620G, network entity data 508 drawn from network entity data store 620A allocated to monitored network 103A, global context data 510 drawn from global communication store data 620E, and/or a network entity graph representation 513 created by analytics sub-system 619, which may show relationships between monitored network 103A and Threat Entity 1.

Referring again to FIG. 6, in the above example, sensing device 200A operating in monitored network 103A collected the relevant communications and stored them in network specific data store 620A. Additionally, anonymized communication metadata from all sensing devices 200A-D has been stored in a global communications data store 620E.

If the investigator from monitored network 103A identifies the communications between the monitored network and unknown network element 104A as malicious, web portal 608 may provide a threat entity view displaying available information about the unknown network device, such as a network entity name, a network entity graph, a listing of communications between client devices 113 in monitored network 103A and the malicious network entity, and/or available characteristics of those communications, such as protocols, frequency, timing, and content. An exemplary view 600 is illustrated in FIG. 6. The information provided by TDAS 600 with regard to Threat Entity 1 may be prioritized based information from analytic sub-service with respect to monitored network 103A and may include a real-time view that is regularly updated with new information about the threat and any new communications between the unknown network device and monitored network 103A.

In the current example, although sensing device 200B has been collecting metadata on the malicious communications traffic between monitored network 103B and unknown network elements 104A-B, without the additional information provided by the attack on monitored network 103A, there is no corresponding threat entity for monitored network 103B. That is, without the context metadata gathered from the attack on monitored network 103A, TDAS 600 may lack the information to automatically categorize the malicious communications between the unknown network elements and monitored network 103B as a threat.

However, once the investigator monitoring monitored network 103A has identified a threat entity involving the unknown network element 104A, in this example the attacker's exploitation server, the context metadata from the attack on monitored network 103A may enable analytics sub-service 619 to identify a relationship between unknown network element 104A and unknown network element 104B, in this example, the attacker's malicious communications command server, and and/or unknown network element 104C, in this example the attacker's data theft server. This relationship may be integrated into Threat Entity 1 in the unified data store. For example, network entities corresponding to unknown network elements 104A-C may all associated with Threat Entity 1 along with characteristics of the communication traffic between them and the compromised client nodes of monitored network 103A and monitored network 103B.

TDAS 600 may provide a notification to an investigator responsible for monitoring monitored network 103B that Threat Entity 1 is applicable to monitored network 103B. The notification may include a view incorporating the anonymized context from the attack on monitored network 103A. The anonymized context from the attack on monitored network 103A may expose malicious traffic involving monitored network 103A and unknown network elements 104A-C without disclosing private data from monitored network 13A. This information may permit the investigator responsible for monitoring monitored network 103B to identify the compromised client nodes on monitored network 103B and to remediate the vulnerabilities of the client nodes to unknown network elements 104A-C. Anonymization of the context data from the monitored networks permits the context data to be used collaboratively without exposing confidential customer information.

Figure 8:
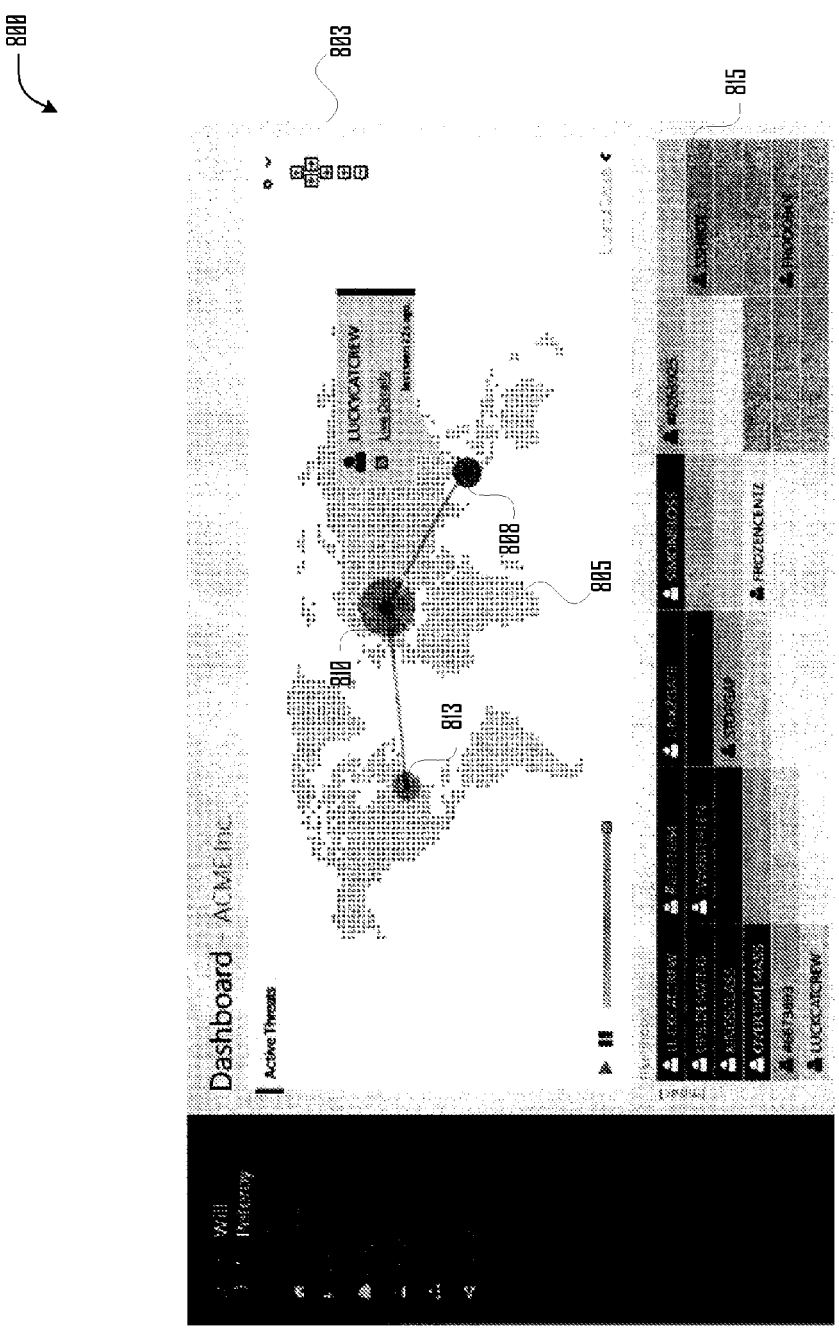
FIG. 8 illustrates an exemplary network attack user interface view provided by the exemplary threat assessment and detection service of FIG. 6 in accordance with at least one embodiment.

FIG. 8 illustrates an exemplary threat entity view 800 with an upper portion 803 illustrating a network entity graph 805. An attacker, LUCYCATCREW, has initiated an attack with a point of origin 808 in Southeast Asia. The attack is routed through a European exchange 810 to a point of entry 813 in the United States. Known threat entities are shown in a lower portion 615 of the display. The known threat entitles may be arranged according to potential impact (x-axis) and likelihood (y-axis).

Figure 9:
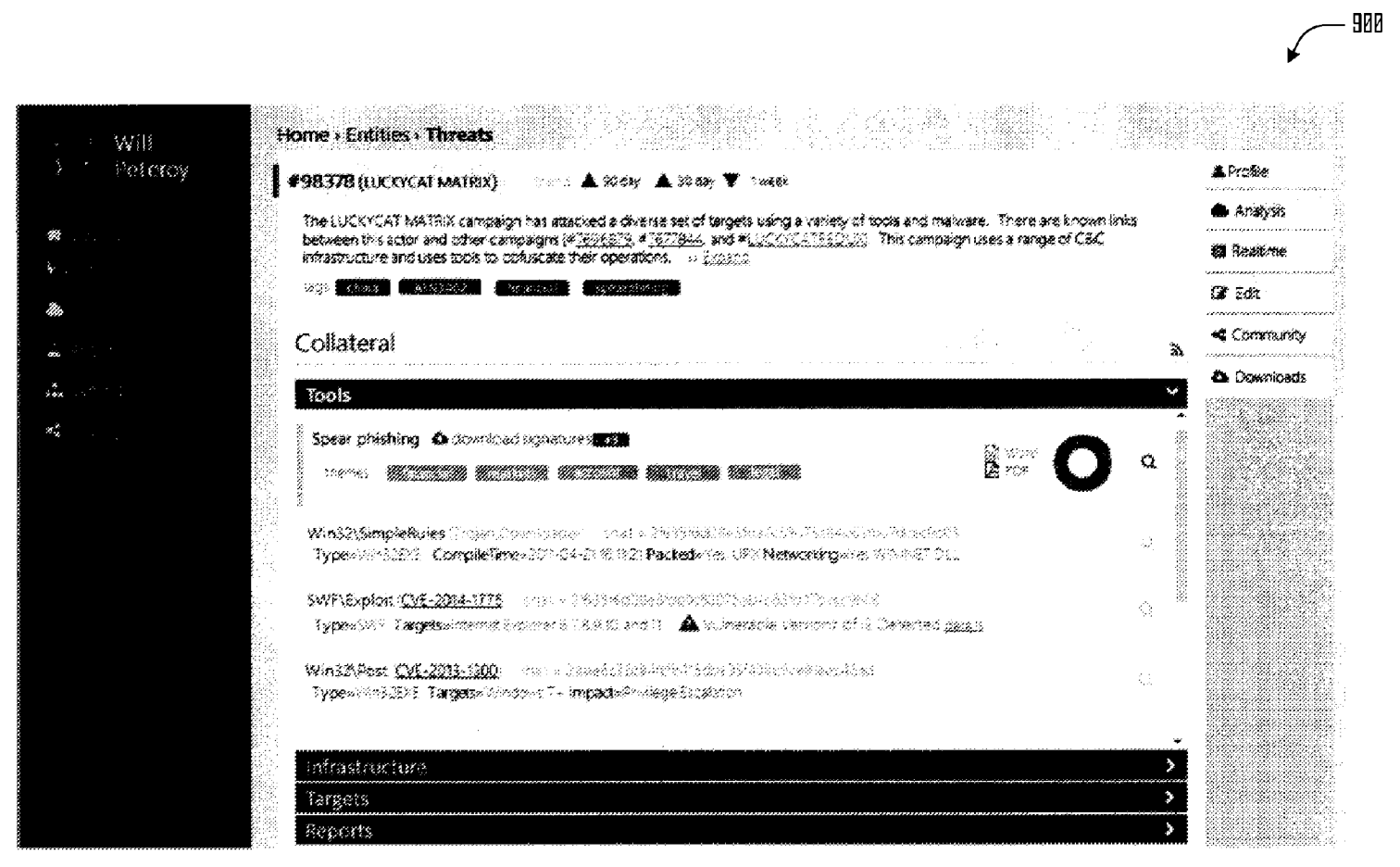

FIG. 9 illustrates an example of a display 900 for particular threat entity, e.g. Threat Entity 1. Display 900 provides information about the threat entity's campaign, characteristics of the attack, and security resources and/or security alerts related to the campaign as well as other attack campaigns that may be related to the threat entity.

Analytics

Analytics sub-service 619 may be applied to identify threats to monitored networks. As threat entities are developed, analytics sub-service 619 may analyze the associated data and identify relationships between threat entities and their relationships with other network elements. Further, some embodiments of analytics sub-system may validate user models, such as threat entities created by users of the system and create new threat intelligence information through analysis of threat entities against global, unified, or anonymized data stores. In addition, machine learning may be used over multiple time periods and combined time periods to validate results and compensates for the changing nature of threats over time. Raw data and data from processed data sources, such as the network specific data stores, global communications data store, network entity data store and external source data store of FIG. 6, are analyzed for linear relationships and algorithms, such as linear vector analysis, are used to filter the data for anomalies. The anomalies may provide the edges for constructing threat entity graphs showing the relationships between threat entities and enabling the application of graph analysis techniques to the threat entity graphs.

Analytics sub-service 619 may operate as a back-end process on the threat entities produced by the threat entity generator sub-service 618, acting on multiple data sources, such as the network specific data stores 620A-D, global communication store 620E, network entity data store 620F, and external source data store 620G. As the threat entity graphs are developed by analytic sub-service 619, the threat entity graphs may be provided to investigators via web portal 608.

Although specific embodiments have been illustrated and described herein, a variety of alternate and/or equivalent implementations may be substituted for the specific embodiments shown and described without departing from the scope of the present disclosure. This application is intended to cover any adaptations or variations of the embodiments discussed herein. For example, the same monitoring, extraction, and anonymization data collection process may be applied to intra-machine communications rather than intra-network communications. In such embodiments, sensing device 200 may be a virtual appliance installed on a host machine and monitoring data exchanges among various hardware and/or software elements on the host machine.

The invention claimed is:

1. A computer implemented method comprising:
obtaining a plurality of network communications from a network, including a first network communication;
identifying a communication protocol related to said first network communication;
identifying a network metadata portion of said first network communication, based at least partially on said communication protocol;
identifying a data portion of said first network communication based at least partially on said communication protocol;
generating anonymized contextual metadata based on said data portion;
combining said network metadata and said anonymized contextual metadata into a first anonymized network communication generating a plurality of encrypted anonymized network communications, including an encrypted version of said first anonymized network communications; and
providing said plurality of encrypted anonymized network communications to a remote server.

2. The method of claim 1, wherein said contextual metadata is derived from characteristics of said first network communication including authorization traffic, HTTP flow, encryption, VPN activity, encryption certificates, passive fingerprints and application traffic.

3. A non-transitory computer-readable medium have contents which configure a computing system to perform a method, the method comprising:
obtaining a plurality of network communications from a network, including a first network communication;
identifying a communication protocol related to said first network communication;
identifying a network metadata portion of said first network communication, based at least partially on said communication protocol;
identifying a data portion of said first network communication based at least partially on said communication protocol;
generating anonymized contextual metadata based on said data portion;
combining said network metadata and said anonymized contextual metadata into a first anonymized network communication generating a plurality of encrypted anonymized network communications, including an encrypted version of said first anonymized network communications; and
providing said plurality of encrypted anonymized network communications to a remote server.

4. The non-transitory computer-readable medium of claim 3 wherein said contextual metadata is derived from characteristics of said first network communication including authorization traffic, HTTP flow, encryption, VPN activity, encryption certificates, passive fingerprints and application traffic.

5. A system, comprising:
one or more memories; and
processing circuitry coupled to the one or more memories, wherein the processing circuitry, in operation, controls a process, the process comprising:
obtaining a plurality of network communications from a network, including a first network communication;
identifying a communication protocol related to said first network communication;
identifying a network metadata portion of said first network communication, based at least partially on said communication protocol;
identifying a data portion of said first network communication based at least partially on said communication protocol;

generating anonymized contextual metadata based on said data portion;

combining said network metadata and said anonymized contextual metadata into a first anonymized network communication generating a plurality of encrypted anonymized network communications, including an encrypted version of said first anonymized network communications; and providing said plurality of encrypted anonymized network communications to a remote server.

6. The system of claim 5 wherein said contextual metadata is derived from characteristics of said first network communication including authorization traffic, HTTP flow, encryption, VPN activity, encryption certificates, passive fingerprints and application traffic.

* * * * *